(12) United States Patent
Haid et al.

(10) Patent No.: US 6,533,525 B2
(45) Date of Patent: Mar. 18, 2003

(54) EXTENDABLE LOADING FLOOR FOR A MOTOR VEHICLE

(75) Inventors: Jürgen J. Haid, Remseck (DE); Horst Holzhauer, Neuhausen (DE)

(73) Assignee: DaimlerChrylser AG, Stuttgart (DE)

( * ) Notice: Subject to any disclaimer, the term of this patent is extended or adjusted under 35 U.S.C. 154(b) by 30 days.

(21) Appl. No.: 09/783,386

(22) Filed: Feb. 15, 2001

(65) Prior Publication Data

US 2001/0036396 A1 Nov. 1, 2001

(30) Foreign Application Priority Data

Feb. 15, 2000  (DE) .......................................... 100 06 617

(51) Int. Cl.$^7$ ................................................. B60P 1/00
(52) U.S. Cl. ........................ 414/522; 414/537; 414/599; 14/69.5; 296/170
(58) Field of Search ................................ 414/539, 522, 414/921, 598, 599, 537; 296/170; 14/71.1, 69.5, 71.3, 71.7

(56) References Cited

U.S. PATENT DOCUMENTS

| | | | |
|---|---|---|---|
| 470,589 A | * | 3/1892 | Neames ...................... 414/599 |
| 2,415,597 A | * | 2/1947 | Le Du ........................ 414/599 |
| 4,520,726 A | * | 6/1985 | Rouly et al. ............ 414/598 X |
| 5,707,203 A | * | 1/1998 | Richter ................... 414/522 X |

FOREIGN PATENT DOCUMENTS

| | | |
|---|---|---|
| DE | 19731324 | 3/1999 |
| DE | 19815466 | 10/1999 |

* cited by examiner

Primary Examiner—Frank E. Werner
(74) Attorney, Agent, or Firm—Crowell & Moring LLP

(57) ABSTRACT

An extendable loading floor for a motor vehicle has a supporting element which is fitted to the loading floor and can be adjusted along an associated supporting rail which extends in the pull-out direction and is connected to the vehicle. The loading floor is adjustable between a retracted position and en extended position. In order to simplify the design of a loading floor of this type, lifting apparatuses are connected to the vehicle and support the loading floor in the vicinity of the loading edge. The lifting apparatuses are designed to carry out a lift. In addition, the supporting rail rises, by a difference in level corresponding to the lift of he lifting apparatus, between a first rail section which faces away from the loading edge and in which the supporting element of the loading floor is supported in its retracted position, and a second rail section which faces the loading edge and in which the supporting element of the loading floor is supported in its extended position.

14 Claims, 2 Drawing Sheets

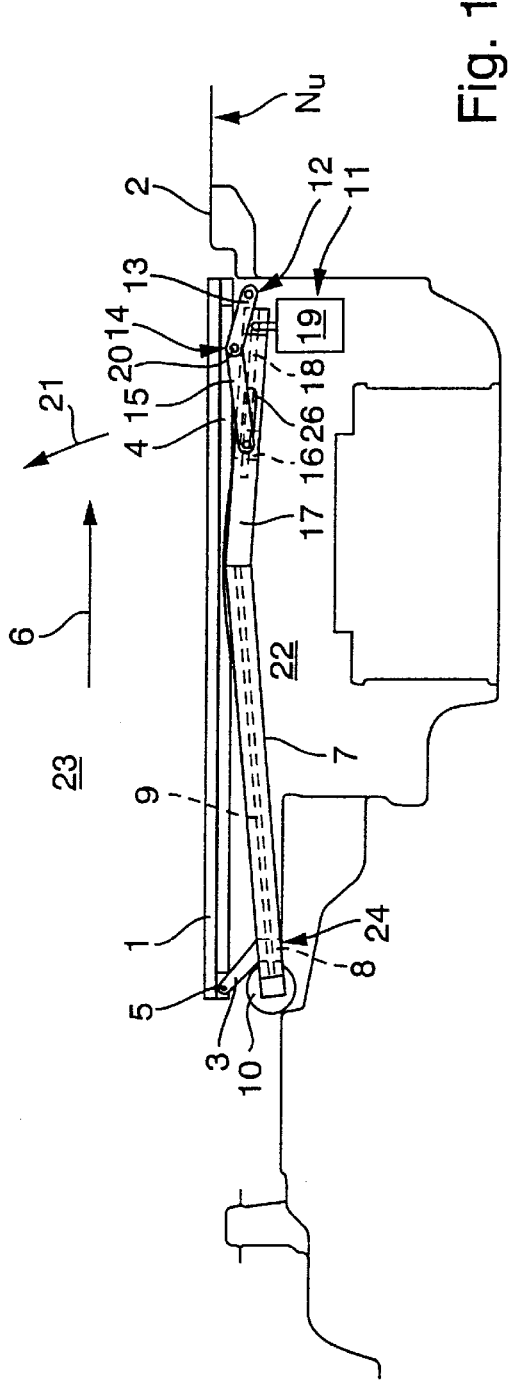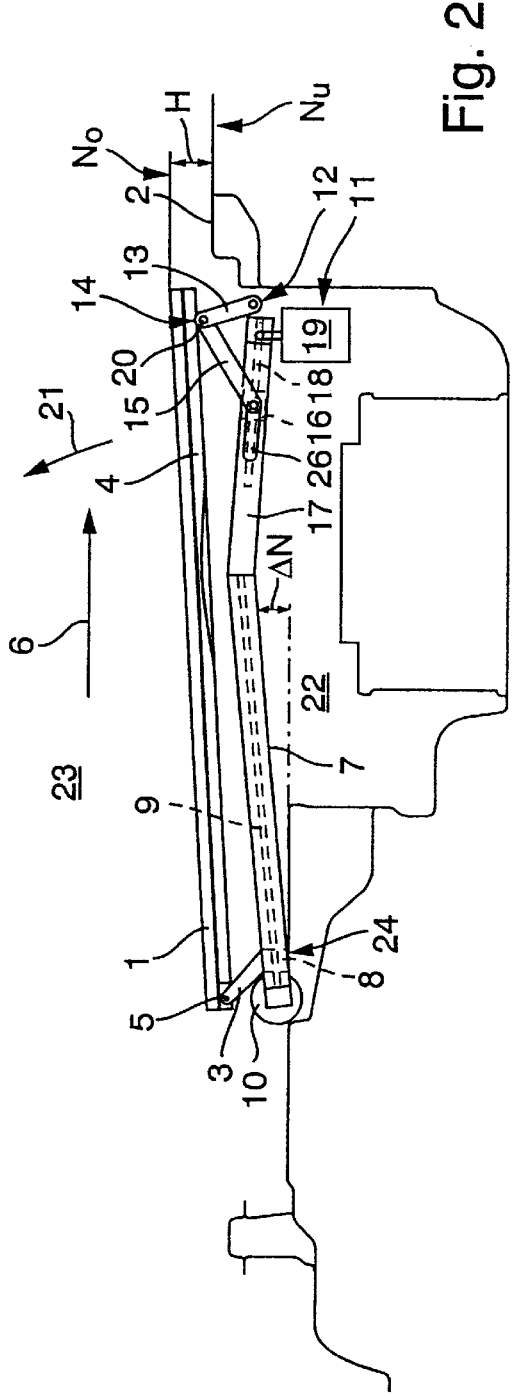

EXTENDABLE LOADING FLOOR FOR A MOTOR VEHICLE

BACKGROUND AND SUMMARY OF THE INVENTION

This application claims the priority of German patent document 100 06 617.8, filed Feb. 15, 2000, the disclosure of which is expressly incorporated by reference herein.

The present invention relates to an extendable loading floor for a motor vehicle, in particular for a motor vehicle provided with a rear flap.

A known loading floor is disclosed in DE 197 31 324 A1 and has a plurality of supporting elements which are designed as rollers, are fastened to the loading floor and can be adjusted in each case along an associated supporting rail. Each supporting rail runs parallel to the pull-out direction and is connected to the vehicle via a linkage. The loading floor can be adjusted between a retracted position and an extended position by an adjusting device comprising the above-mentioned linkage. In the retracted position, the loading floor is arranged completely within a loading space bounded by a loading edge and on a lowered level. In contrast thereto, in its extended position the loading floor protruding at least partially over the loading edge juts out of the loading space, the loading floor in addition being situated on a raised level rising above the loading edge.

The adjusting device used for adjusting the loading floor has parallel links in a parallelogram arrangement, so that as it is being lifted the loading floor is adjusted parallel to itself upwards and in the extension direction. Because of the multiplicity of bearing points and movable parts, the known loading floor has a relatively complicated design.

SUMMARY OF THE INVENTION

An object of the present invention is to achieve a simplified design for a loading-space floor of the type mentioned above.

According to the present invention, this object has been acheived by a loading floor based on the general concept of adjusting the loading floor between the lower level and the upper level using lifting apparatus only in a region in the vicinity of the loading edge, with the loading floor being inclined with respect to a horizontal plane. The horizontal alignment of the loading-space floor then takes place during extension of the loading floor, because the supporting rail which is fixed to the vehicle has a corresponding inclination which is selected in such a way that the loading floor is aligned essentially horizontally at least in its extended position.

The adjusting device of the loading floor according to the present invention therefore requires lifting apparatus only in the vicinity of the loading edge, because the lifting up or lowering of the loading floor otherwise takes place on account of the specific shaping of the supporting rail which is fixed to the vehicle. Accordingly, the loading floor according to the present invention is effective with only a few bearing points and a few pivoting elements, giving rise to a particularly simple design.

In accordance with a currently preferred embodiment, the supporting rail may be designed in such a manner that it rises, in particular rectilinearly, from a first rail section, in which the supporting element of the loading floor is supported in its retracted position, to a second rail section, in which the supporting element of the loading floor is supported in its extended position. In this manner, the maximum achievable inclination of the loading floor with respect to a horizontal plane is relatively small, as a result of which, during the lifting up and lowering, slipping of a load placed on the loading floor can be avoided.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a loading floor according to the present invention in a retracted position with a completely lowered loading floor, FIG. 2 is a side view as in FIG. 1, but with a partially lifted-up loading floor.

DETAILED DESCRIPTION OF THE DRAWINGS

Figure 3:
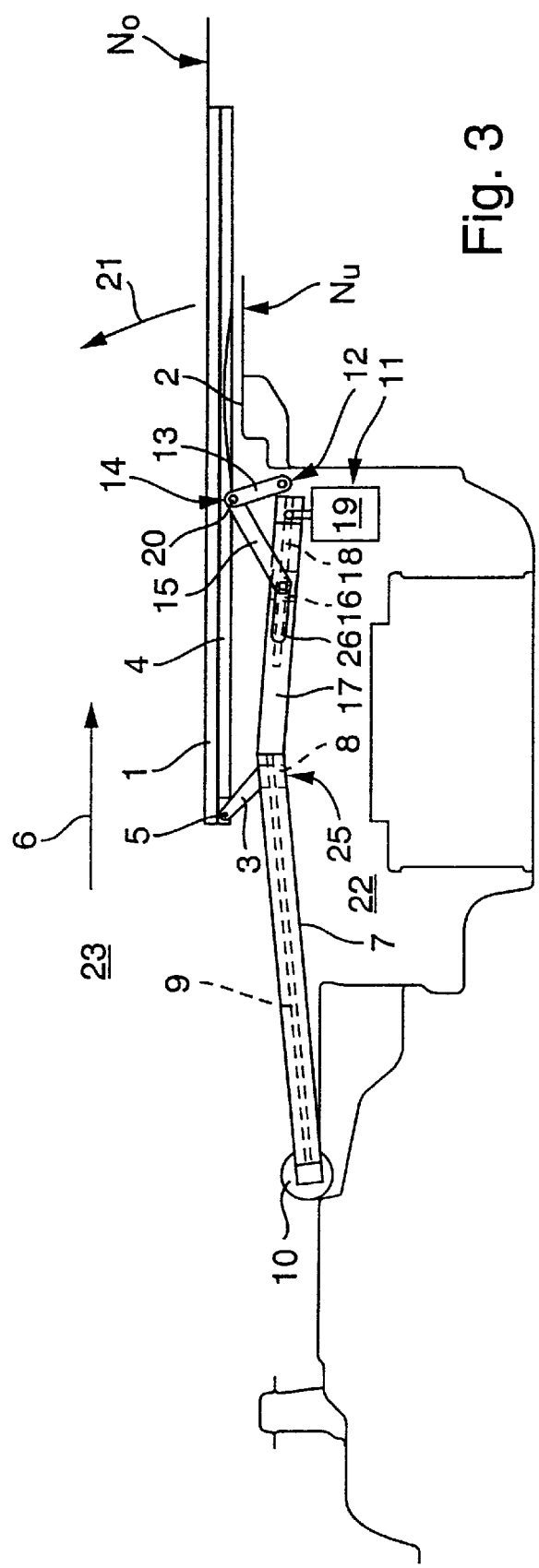
FIG. 3 is a side view as in FIGS. 1 and 2, but with the loading floor adjusted into its extended position.

According to FIGS. 1 to 3, a loading floor 1 according to the invention has, on its lower side, a guide rail 4 and, at an end facing away from a loading edge 2, a supporting element 3. Although the loading floor 1 is expediently fitted on each of its longitudinal sides with a supporting element 3 of this type and with a guide rail 4 of this type, in principle a single guide rail 4 expediently arranged centrally may suffice, and likewise an individual supporting element 3 may be sufficient. The supporting element 3 is mounted on the loading floor 1 in a manner allowing it to pivot about a pivot axis 5 which runs parallel to the loading floor 1 and perpendicularly with respect to an extension direction symbolized in the drawings by an arrow 6, i.e. the pivot axis 5 is perpendicular on the plane of projection. At an end 8 facing away from the loading floor 1 the supporting element 3 is mounted in a supporting rail 7. The end 8 is supported on the supporting rail 7 and is adjustable therein in the longitudinal direction of the rail 7. The supporting rail 7 is fastened to a vehicle which is otherwise not illustrated.

The supporting rail 7 contains a spindle rod or spindle 9 which is provided with an external thread and, at an end remote from the loading edge 2, can be driven by a motor 10. The motor 10 is, for example, an electric motor. That end 8 of the supporting element 3 which can be adjusted in the supporting rail 7 engages on this spindle 9, for which purpose the end 8 is provided with a corresponding internal thread. Rotation of the spindle 9 can therefore cause the supporting element 3 to be adjusted bidirectionally within the supporting rail 7 along the spindle 9.

Lifting apparatus 11 which have a toggle-lever arrangement 12 are arranged in the vicinity of the loading edge 2. This toggle-lever arrangement 12 has a first lever 13 which, at an end facing the loading edge 2, is mounted on the vehicle. Formed at the opposite end of the first lever 13 is a toggle region 14 or a toggle of the toggle-lever arrangement 12, in which the first lever 13 is mounted on a second lever 15. The second lever 15 is supported, at an end 16 which faces away from the toggle region 14, on a guide rail 17 which is fastened to the vehicle and in which the end 16 of the second lever 15 can be adjusted bidirectionally in the longitudinal direction of the guide rail 17. Arranged in the interior of the guide rail 17 is a spindle or spindle rod 18 which has an external thread and can be driven in a rotating manner by a motor 19, which is preferably designed as an electric motor. That end 16 of the second lever 15 which faces away from the toggle region 14 engages on this spindle 18, the end 16 having a corresponding opening with a corresponding internal thread. Rotation of the spindle 18 can therefore cause the end 16 of the second lever 15 to be adjusted bidirectionally within the guide rail 17 along the spindle 18.

In the toggle region 14, the toggle-lever arrangement 12 has a supporting member 20 which may be formed, for example, by a bolt. The guide rail 4 of the loading floor 1 is supported on this supporting member 20. By virtue of a suitable configuration of the guide rail 4 and of the supporting member 20, lateral guiding of the loading floor 1 can be achieved. The supporting member 20 may, for example, be designed as a roller or as a sliding block.

Because the loading floor 1, at its end which is remote from the loading edge 2, is mounted on the supporting element 3 in a manner allowing it to pivot about the pivot axis 5, and the loading floor 1 rests in the vicinity of the loading edge 2 on the supporting member 20, the loading floor 1 can be swung out about the pivot axis 5, as indicated by an arrow 21. A stowage space 22 formed below the loading floor 1 is thereby accessible in a relatively simple manner.

In the retracted position of the loading floor 1 illustrated in FIG. 1 the loading floor 1 is aligned essentially horizontally. The loading floor 1 is situated here completely within a loading space 23 bounded by the loading edge 2. In addition, the loading floor 1 is situated on a lower level $N_u$, which corresponds here to the level of the loading edge 2, with the result that the loading edge 2 and loading floor 1 are aligned.

If the loading floor 1 is to be transferred from the retracted position, which is represented in FIG. 1, into the extended position represented in FIG. 3, first of all the motor 19 assigned to the lifting apparatus 11 is actuated. The spindle 18, which is driven by the motor 19, rotates in such a manner that that end 16 of the second lever 15 which is in engagement with it moves towards the loading edge 2. This longitudinal adjustment of the end 16 within the guide rail 17 causes the toggle region 14, and therefore the supporting member 20 formed on it, to be lifted up to an upper level lying above the loading edge 2. In the process, the supporting member 20 is adjusted along the guide rail 4. In addition, the loading floor 1 thereby executes a lift H in the section assigned to the loading edge 2, as seen in FIG. 2.

Because the loading floor 1 is lifted up only in the vicinity of the loading edge 2 by the lifting apparatus 11, the loading floor 1, in the intermediate position represented in FIG. 2, becomes inclined with respect to the horizontal.

After the lifting up of that end of the loading floor 1 which faces the loading edge 2, the motor 10 assigned to the supporting rail 7 is actuated and drives the spindle 9 which is connected thereto, as a result of which that end 6 of the supporting element 3 which is in engagement with the said spindle is adjusted along the spindle 9 in the supporting rail 7. With the supporting element 3 connected to the loading floor 1, the loading floor 1 is moved in the extension direction 6 as a result.

The supporting rail 7 is configured in such a manner that it rises rectilinearly and continuously between a rail section 24 which faces away from the loading edge 2 and in which the supporting element 3 of the loading floor 1 is supported in the retracted position (FIG. 2) and a second rail section 25 which faces the loading edge 2 and in which the supporting element 3 of the loading floor 1 is supported in the extended position (FIG. 3). In this manner, the supporting element 3 of the loading floor 1, and therefore that end of the loading floor 1 which is connected to the supporting element 3, overcomes a difference in level ΔN formed between the rail sections 24, 25. The difference in level ΔN between the two rail sections 24, 25 is preferably selected such that it is approximately the same size as the lift H which can be obtained by the lifting apparatus 11, as a result of which the loading floor 1 is again aligned horizontally in the extended position represented in FIG. 3. In this extended position, the loading floor 1 protrudes at least partially over the loading edge 2 and in the process juts out of the loading space 23, the loading floor 1 being situated on an upper level $N_o$.

The supporting rail 7 and the guide rail 17 are preferably designed as a single piece, resulting in a particularly simple design for the loading floor 1 according to the invention and for its adjusting device. The use of spindles 9, 18 enables additional securing measures to be omitted, because a spindle drive of this type may be of self-locking design.

An embodiment is currently preferred in which the levers 13, 15 of the toggle-lever arrangement 12 are formed in pairs. Accordingly, an element is seated on the spindle 18 and is connected in an articulated manner to the respectively assigned, second levers 15 via lateral bolts in each case penetrating the guide rail 17 in a slot 26.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Extendable loading floor for a motor vehicle provided with a rear flap, comprising at least one supporting element which is fitted to the loading floor and is adjustable along an associated supporting rail extending in a pull-out direction and is connectable to the vehicle, and an adjusting device for adjusting the loading floor between a retracted position, in which the loading floor is arranged on a lowered level ($N_u$) completely within a loading space bounded by a loading edge, and an extended position, in which the loading floor protruding at least partially over the loading edge juts out of the loading space and is arranged on a raised level ($N_o$) rising above the loading edge, the adjusting device having lifting apparatus which is connectable to the vehicle and supports the loading floor in a vicinity of the loading edge, and the lifting apparatus being configured to carry out a lift (H) which corresponds to a difference in level between the raised level ($N_o$) and lowered level ($N_u$) of the loading floor, wherein the associated supporting rail rises between a first rail section which faces away from the loading edge in which the supporting element of the loading floor is supported in its retracted position, and a second rail section which faces the loading edge and in which the supporting element of the loading floor is supported in its extended position, a difference in level (ΔN) between the first rail section and second rail section corresponding to the lift (H) of the lifting apparatus.

2. Loading floor according to claim 1, wherein the associated supporting rail (7) rises rectilinearly between the first rail section (24) and the second rail section (25).

3. Loading floor according to claim 1, wherein the at least one supporting element (3) is mounted on the loading floor (1) about a pivot axis (5) running parallel to the loading floor (1) and transversely to the extension direction (6).

4. Loading floor according to claim 1, wherein the lifting apparatus (11) have at least one supporting member (20)

which is supported on a guide rail (4) fitted to the loading floor (1) to support the loading floor (1).

5. Loading floor according to claim 4, wherein the supporting member is one of a roller and a sliding block.

6. Loading floor according to claim 1, wherein the lifting apparatus (11) comprise at least one toggle-lever arrangement (12) which has a first lever (13) mountable at one end on the vehicle and at the other end, in a toggle region (14) of the toggle-lever arrangement (12), is mountable on a second lever (15) which, at an end thereof facing away from the toggle region (14), is adjustable along a guide rail (17) fittable to the vehicle.

7. Loading floor according to claim 6, wherein the guide rail (17) extends in the extension direction (6) and is operatively connected to the supporting rail (7), the guide rail (17) and supporting rail (7) following one after the other in the extension direction (6).

8. Loading floor according to claim 7, wherein the guide rail and supporting rail constitute a single piece.

9. Loading floor according to claim 6, wherein the supporting member is arranged in the toggle region.

10. Loading floor according to claim 9, wherein the lifting apparatus (11) comprise at least one toggle-lever arrangement (12) which has a first lever (13) mountable at one end on the vehicle and at the other end, in a toggle region (14) of the toggle-lever arrangement (12), is mountable on a second lever (15) which, at an end thereof facing away from the toggle region (14), is adjustable along a guide rail (17) fittable to the vehicle.

11. Loading floor according to one of claim 6, wherein the guide rail (17) comprises a spindle (18) driven by a motor (19) and to which the second lever (15) has a driving connection at an end thereof (16) facing away from the toggle region (14).

12. Loading floor according to claim 1 wherein the supporting rail (7) comprises a spindle (9) driven by a motor (10) and to which the associated supporting element (3) has a driving connection.

13. Loading floor according to claim 1, wherein the loading floor (1) is mounted on at least one supporting element (3) about a pivot axis (5) running parallel to the loading floor (1) and transversely to the extension direction (6), and the loading floor (1) rests on at least one supporting member (20) of the lifting apparatus (11) to swing out the loading floor (1) about the pivot axis (5).

14. Loading floor according to claim 1, wherein the lowered level ($N_u$) of the loading floor lies one of below the loading edge and approximately level with the loading edge.

* * * * *